T. A. Long,
Soda Fountain.
No. 3563. Reissued July 20. 1869.
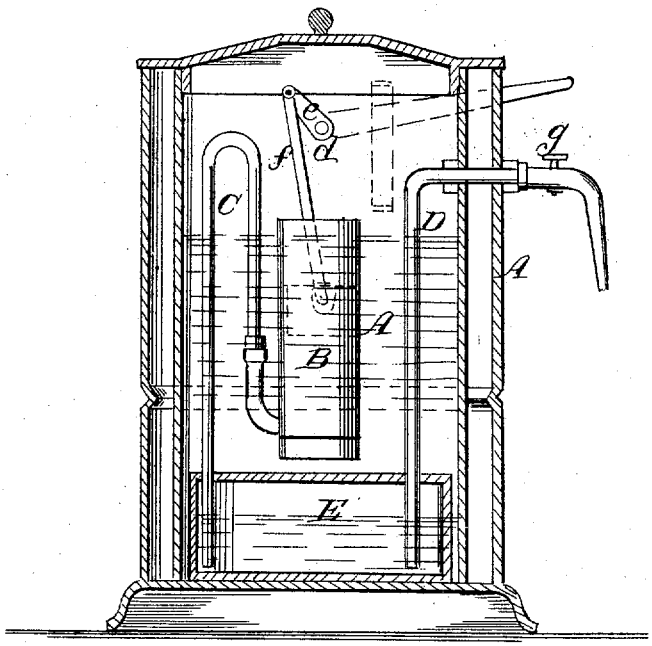
Witnesses.
Theo Tusche
Wm Tuvin
Inventor
T A Long
Per Munn & Co
Attorneys
N. PETERS, PHOTO-LITHOGRAPHER, WASHINGTON, D. C.

United States Patent Office.

E. C. THOMPSON, OF ROCHESTER, NEW YORK, ASSIGNEE OF T. A. LONG.

*Letters Patent No.* 63,537, *dated April* 2, 1867; *reissue No.* 3,563, *dated July* 20, 1869.

IMPROVEMENT IN SODA-FOUNTAINS.

The Schedule referred to in these Letters Patent and making part of the same.

*To all whom it may concern:*

Be it known that T. A. LONG, of Meadville, in the county of Crawford, and State of Pennsylvania, did invent a certain new and useful Improvement in Soda-Fountains, for which Letters Patent were granted, April 2, 1867, and of which, I, E. C. THOMPSON, of Rochester, county of Monroe, and State of New York, am sole assignee; and I do hereby declare that the following is a full and exact description thereof, reference being had to the accompanying drawings, making part of this specification, in which the figure represents a central vertical section of the fountain.

This invention consists of a portable soda-fountain, having the pump itself, as well as the air-chamber and pipes, located in the interior of the case, said pump being immersed in the liquid from which the soda is made, and serving to force the same into the air-chamber, from which it is discharged by the elasticity of the confined air.

In the drawings—

A indicates the outer case, which is constructed with double walls;

B represents the force-pump, which rests in the interior of the case, and is submerged in the soda-liquid;

C is a pipe, leading from the pump to the air-chamber;

E is the air-chamber; and

D, the discharge-pipe, which latter is provided with the ordinary cock *g*, by which the flow of the liquid is controlled.

The fulcrum or pivot to which the pump-handle is attached, passes through the side of the case A, as seen at *d* in the drawings. Its inner end is turned at right angles with the pivot, forming an arm, to the end of which the piston-rod of the pump is attached.

This arm is seen at *e*, and *f* denotes the piston-rod.

The handle *b* is attached rigidly to the outer end of the pivot, outside of the case.

The water, ice, and soda are placed in the case A, surrounding the pump, and are drawn into the pump by the action of the piston, and forced through pipe C into the air-chamber E. Here, when charged, the compressed air reacts, and forces the liquid up through pipe D, whence it is discharged into the glass having the proper acid therein.

It will be noticed that in the arrangement above described, the pump itself, as well as the air-chamber and pipes, is located in the interior of the case, and is surrounded by the liquid, which is drawn directly therein under action.

By this means the fountain has no outside attachment, but presents a plane surface, and is made perfectly portable, as much so as an ordinary ice-cooler or water-pail, and can be removed from one place to another with the greatest facility and ease, and can be placed out of the way when not in use.

This feature of combining the pump with the other parts, in the interior of the case, I believe to be new.

I am aware that in other fountains the air-chamber has been employed inside the case, as in patents No. 12,489 and No. 39,976; but in those cases the pump is located outside the fountain, which renders them unhandy in use, and prevents the employment of a simple portable cylindrical case with no projecting parts. They also require a long circuit of the fluid in passing through the pump to the air-chamber, and require it to be brought out of the fountain in the circuit, by which means it loses its coolness in a great degree, especially when standing in the pipe some time, which is frequently unavoidable.

In my arrangement, the fluid in its circuit remains within the fountain till its discharge, and therefore it cannot lose its coolness.

In addition to the above, my pump being submerged in the liquid, is more sensitive, and requires much less action of the pump.

If the elasticity of the air-chamber is exhausted, a single quick stroke will renew it without loss of time, which would occur from the long circuit of the other fountains before described.

In addition to this, the submerged pump is self-packing, and not liable to disarrangement.

I do not claim the combination of a pump and an air-chamber with a soda-fountain, as I am aware that the same is not new; but

What I claim as the invention of the said T. A. LONG, is—

A portable soda-fountain, in which both the air-chamber and the pump are situated in the interior of the case, the pump being submerged in the liquid and so arranged as to force the liquid to the air-chamber without carrying it out of the fountain, as herein set forth.

In witness whereof, I have hereunto set my signature, this 27th day of May, 1869.

E. C. THOMPSON.

Witnesses:

R. F. OSGOOD,

GEO. W. MIATT.